(12) United States Patent
Eckel et al.

(10) Patent No.: US 6,706,788 B2
(45) Date of Patent: Mar. 16, 2004

(54) FLAME-RESISTANT POLYCARBONATE MOULDING MATERIALS WHICH ARE DIMENSIONALLY STABLE AT HIGH TEMPERATURES AND HAVE HIGH FLOW LINE STRENGTH

(75) Inventors: Thomas Eckel, Dormagen (DE); Michael Bödiger, Dormagen (DE); Dieter Wittmann, Leverkusen (DE); Heinrich Alberts, Odenthal (DE); Klaus Horn, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/424,035

(22) PCT Filed: May 11, 1998

(86) PCT No.: PCT/EP98/02730

§ 371 (c)(1),
(2), (4) Date: Nov. 17, 1999

(87) PCT Pub. No.: WO98/53002

PCT Pub. Date: Nov. 26, 1998

(65) Prior Publication Data

US 2002/0072553 A1 Jun. 13, 2002

(30) Foreign Application Priority Data

May 23, 1997 (DE) .......................... 197 21 628

(51) Int. Cl.⁷ .............................................. C08K 5/523
(52) U.S. Cl. ..................................... 524/127; 524/145
(58) Field of Search ................................ 524/127, 145

(56) References Cited

U.S. PATENT DOCUMENTS

| | | | | |
|---|---|---|---|---|
| 4,172,103 A | * | 10/1979 | Serini et al. .................. 525/76 |
| 4,983,568 A | | 1/1991 | Ikeda ......................... 503/208 |
| 5,030,675 A | | 7/1991 | Wittmann et al. ........... 524/130 |
| 5,061,745 A | * | 10/1991 | Wittmann et al. ........... 524/143 |
| 5,157,065 A | * | 10/1992 | Fuhr et al. .................. 524/141 |
| 5,204,394 A | | 4/1993 | Gosens et al. ............... 524/125 |
| 5,455,292 A | * | 10/1995 | Kakegawa et al. .......... 524/141 |
| 5,672,645 A | * | 9/1997 | Eckel et al. ................. 524/127 |
| 5,674,924 A | | 10/1997 | Lee et al. .................... 523/201 |
| 5,733,957 A | * | 3/1998 | Podszun et al. ............. 524/127 |
| 5,741,838 A | * | 4/1998 | Fuhr et al. .................. 524/127 |
| 5,750,602 A | * | 5/1998 | Kohler et al. ............... 524/127 |
| 5,871,570 A | * | 2/1999 | Koyama et al. ............. 524/143 |

FOREIGN PATENT DOCUMENTS

| | | |
|---|---|---|
| EP | 0 731 140 | 9/1996 |
| EP | 767204 | 4/1997 |
| EP | 771852 | 5/1997 |
| JP | 59-202240 | 11/1984 |

* cited by examiner

*Primary Examiner*—Peter Szekely
(74) *Attorney, Agent, or Firm*—Joseph C. Gil; Aron Preis

(57) ABSTRACT

Flame-resistant, thermoplastic moulding compositions containing
A) 70 to 98 parts by weight of an aromatic polycarbonate,
B) 0.5 to 20 parts by weight of a graft polymer,
C) 0.5 to 5 parts by weight of a mixture of
   C.1) 10 to 90 parts by weight, based on C, of a monophosphorus compound of formula (I)

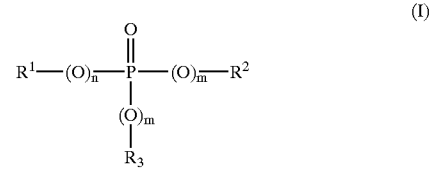

C.2) 90 to 10 wt. %, based on C, of a phosphorus compound of formula (II)

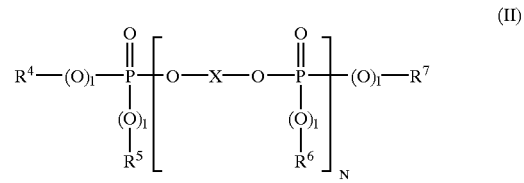

D) 0.05 to 5 parts by weight of a fluorinated polyolefin with an average particle diameter of 0.05 to 1000 μm, a density of 1.2 to 2.3 g/m³ and a fluorine content of 65 to 76 wt. %.

16 Claims, No Drawings

FLAME-RESISTANT POLYCARBONATE MOULDING MATERIALS WHICH ARE DIMENSIONALLY STABLE AT HIGH TEMPERATURES AND HAVE HIGH FLOW LINE STRENGTH

The present invention relates to flame resistant moulding compositions of polycarbonates and graft polymers, which are provided with their flame resistant properties by an active additive combination of a monophosphorus compound and an oligomeric phosphorus compound. The moulding compositions according to the invention are distinguished by high heat resistance, very high weld line strength and excellent flame resistance.

EP-A 0 174 493 (U.S. Pat. No. 4 983 658) describes flameproofed, halogen-containing polymer mixtures of aromatic polycarbonate, styrene-containing graft copolymer, monophosphates and a special polytetrafluoroethylene formulation. Although these mixtures are adequate in terms of their fire behaviour and the level of their mechanical values, deficiencies may occur in their weld line strength and their thermal stability.

In U.S. Pat. No. 5 030 675, flame resistant, thermoplastic moulding compositions consisting of aromatic polycarbonate, ABS polymer, polyalkylene terephthalate, together with monophosphates and fluorinated polyolefins as flame retardants, are described. Good stress cracking resistance and weld line strength are opposed by the disadvantages of deficiencies in their notched impact strength and inadequate thermal stability under high thermal stress, such as, for example, during processing. Another disadvantage may be seen in the fact that relatively large quantities of flame retardant are needed to achieve effective flameproofing, which greatly reduce the heat resistance.

Diphosphates are known as flame retardants. In JA 59 202 240 the preparation of such a product from phosphorus oxychloride, diphenols such as hydroquinone or bisphenol A and monophenols such as phenol or cresol is described. These diphosphates may be used as flame retardants in polyamide or polycarbonate.

In EP-A 0 363 608 (=U.S. Pat. No. 5 204 394), polymer mixtures of aromatic polycarbonate, styrene-containing copolymer and graft copolymer together with oligomeric phosphates as flame retardants are described. Although these mixtures display good flame resistance and reduced mould plate-out, they do not possess the high weld line strength and flame retardant effect required for many applications. As the molecular weight of the oligomeric phosphates increases, the effectiveness in terms of flame proofing decreases.

In EP-A 0 640 655, moulding compositions consisting of polycarbonate, styrene copolymer, ABS graft polymers and a combination of monophosphates and oligomeric phosphates as flame retardants are described. Here again, the low weld line strength caused by the styrene copolymers should be mentioned as a disadvantage.

According to DE-A 195 47 013, moulding compositions consisting of polycarbonate, graft polymer and oligomeric phosphates as flame retardants possess excellent flame resistance. No monophosphates are contained in the moulding compositions according to the invention.

In EP-A 0 731 140, polymer mixtures of polycarbonate, graft polymer and a combination of monophosphates and oligomeric phosphates as flame retardants are described. These mixtures possess good flame resistance and good thermal stability. However, it is a disadvantage that at least 5 parts by weight of the phosphorus compound are required to achieve an effective flame retardant (V-0 for 1.6 mm thickness according to UL 94 V), which has negative effects on heat resistance.

Surprisingly, it has now been found that halogen-free moulding compositions consisting of polycarbonate, graft polymer and a flame retardant combination of a monophosphorus compound and a phosphorus compound have a very favourable combination of properties of high heat resistance, good mechanical level (notched impact strength, weld line strength) and excellent flame resistance.

The invention provides flame resistant, thermoplastic moulding compositions containing A) 70 to 98 parts by weight, preferably 75 to 98 parts by weight, particularly preferably 80 to 98 parts by weight, of an aromatic polycarbonate, B) 0.5 to 20 parts by weight, preferably 1 to 20 parts by weight, particularly preferably 2 to 12 parts by weight, of a graft polymer, C) 0.5 to 5 parts by weight, preferably 0.5 to 4 parts by weight, particularly preferably 0.5 to 3 parts by weight, of a mixture of C.1) 10 to 90 wt. %, preferably 12 to 50, particularly 14 to 40, especially preferably 15 to 40 wt. % (based on the total quantity of C), of a monophosphorus compound of formula (I)

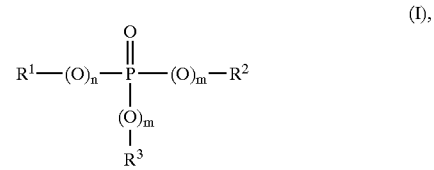

where $R^1$, $R^2$ and $R^3$, independently of one another, signify $C_1$–$C_8$-alkyl, $C_6$–$C_{20}$-aryl or $C_7$–$C_{12}$-aralkyl, m signifies 0 or 1 and n signifies 0 or 1 and C.2) 90 to 10 wt. %, preferably 88 to 50, particularly 86 to 60, especially preferably 85 to 60 wt. % (based on the total quantity of C), of a phosphorus compound of formula (II)

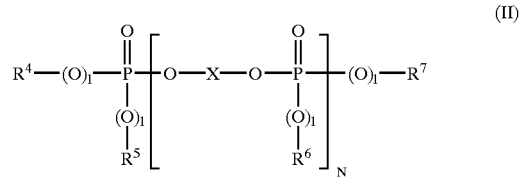

where $R^4$, $R^5$, $R^6$, $R^7$, independently of one another, signify $C_1$–$C_8$-alkyl, $C_5$–$C_6$-cycloalkyl, $C_6$–$C_{10}$-aryl or $C_7$–$C_{12}$-aralkyl, I independently of one another, signifies 0 or 1, N signifies 1 to 5 and X signifies a mononuclear or polynuclear aromatic radical with 6 to 30 C atoms, D) 0.05 to 5 parts by weight, preferably 0.1 to 2 parts by weight, particularly preferably 0.1 to 1 part by weight of a fluorinated polyolefin with an average particle diameter of 0.05 to 1000 μm, a density of 1.2 to 2.3 g/cm$^3$ and a fluorine content of 65 to 76 wt. %.

Component A

Thermoplastic, aromatic polycarbonates according to component A that are suitable according to the invention are those based on the diphenols of formula (III)

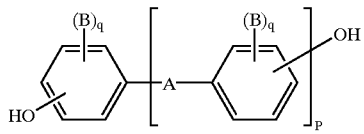

where

A signifies a single bond, $C_1$–$C_5$-alkylene, $C_2$–$C_5$-alkylidene, $C_5$–$C_6$-cyclo-alkylidene, —S— or —$SO_2$—, B independently of one another signify $C_1$–$C_8$ alkyl, $C_6$–$C_{10}$ aryl, $C_7$–$C_{12}$ aralkyl q signifies 0, 1 or 2 and p signifies 1 or 0 or alkyl-substituted dihydroxyphenylcycloalkanes of formula (IV),

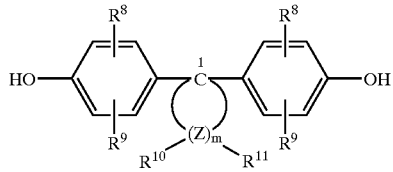

where $R^8$ and $R^9$, independently of one another, signify hydrogen, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, particularly benzyl, m signifies an integer from 4, 5, 6 or 7, preferably 4 or 5, $R^{10}$ and $R^{11}$, selectable individually for each Z and independently of one another, signify hydrogen or $C_1$–$C_6$-alkyl and Z signifies carbon, with the proviso that $R^{10}$ and $R^{11}$ both signify alkyl simultaneously on at least one Z atom.

Suitable diphenols of formula (III) are, e.g., hydroquinone, resorcinol, 4,4'-dihydroxydiphenyl, 2,2-bis (4-hydroxyphenyl)propane, 2,4-bis(4-hydroxyphenyl)-2-methylbutane, 1,1-bis(4-hydroxyphenyl)cyclohexane.

Preferred diphenols of formula (III) are 2,2-bis(4-hydroxyphenyl)propane, 2,2- and 1,1-bis(4-hydroxyphenyl) cyclohexane.

Preferred diphenols of formula (IV) are 1,1-bis(4-hydroxyphenyl)-3,3-dimethyl-cyclohexane, 1,1-bis(4-hydroxyphenyl)-3,3,5-trimethylcyclohexane and 1,1-bis(4-hydroxyphenyl)-2,4,4-trimethylcyclopentane.

Polycarbonates that are suitable according to the invention are both homopolycarbonates and copolycarbonates.

Component A may also be a mixture of the thermoplastic polycarbonates defined above.

Polycarbonates may be produced by known means from diphenols with phosgene by the phase boundary process, or with phosgene by the homogeneous phase process, the so-called pyridine process, the molecular weight being adjustable by known means by an appropriate quantity of known chain terminators.

Suitable chain terminators are, e.g., phenol, p-tert-butylphenol or else long-chain alkylphenols, such as 4-(1,3-tetramethylbutyl)phenol according to DE-OS 2 842 005 or monoalkylphenol or dialkylphenol with a total of 8 to 20 C atoms in the alkyl substituents according to German Patent Application P 3 506 472.2, such as 3,5-di-tert-butylphenol, p-isooctylphenol), p-tert-octylphenol, p-dodecylphenol and 2-(3,5-dimethylheptyl)phenol and 4-(3,5-dimethylheptyl) phenol.

The quantity of chain terminators is generally between 0.5 and 10 mole %, based on the sum of the diphenols of formulae (III) and/or (IV) used in each case.

The polycarbonates A that are suitable according to the invention have average molecular weights ($\overline{M}_w$, weight average, measured e.g. by ultracentrifugation or nephelometry) of 10,000 to 200,000, preferably 20,000 to 80,000.

The polycarbonates A that are suitable according to the invention may be branched by known means, preferably by incorporating 0.05 to 2 mole %, based on the sum of the diphenols used, of trifunctional or more than trifunctional compounds, e.g. those with three or more phenolic groups.

Preferred polycarbonates besides bisphenol A homopolycarbonate are the copolycarbonates of bisphenol A with up to 60 mole %, based on the molar sums of diphenols, of 1,1-bis(4-hydroxyphenyl)-3,3,5-trimethylcyclohexane.

The polycarbonates A may be partially or completely replaced by aromatic polyester carbonates.

In another embodiment, the aromatic polycarbonate A may be replaced from a mixture of two or more polycarbonates A.1 and A.2 with the same or different structure, which have different relative solution viscosities. The polycarbonates preferably have the same structures.

Based on the mixture of polycarbonates A.1 and A.2, the proportion of A.1 by weight is 5 to 95, preferably 25 to 75 wt. %, particularly 10 to 35 wt. %, and the proportion of A.2 by weight is 95 to 5, preferably 75 to 25 wt. %, particularly 35 to 10 wt. %.

The mixture of polycarbonates A.1 and A.2 is distinguished by the fact that the relative solution viscosity of A.1 is 1.18 to 1.24 and that the relative solution viscosity of A.2 is 1.24 to 1.34. The difference between the relative solution viscosities of A.1 and A.2 is preferably greater than or equal to 0.06, particularly—greater than or equal to 0.09, i.e. relative solution viscosity (A.2)—relative solution viscosity (A.1)$\geq$0.06, particularly$\geq$0.09. The relative solution viscosity is measured in $CH_2Cl_2$ as solvent at 25° C. at a concentration of 0.5 g/100 ml.

One of the two polycarbonate components A.1 or A.2 in the mixture may be a recycled polycarbonate. Recycled polycarbonate means those products that already have a processing cycle and life cycle behind them and have been freed from adherent impurities by special reworking processes to the extent that they are suitable for further applications.

Component B

The graft polymers B comprise, e.g., graft polymers with rubber-elastic properties, which are essentially obtainable from at least 2 of the following monomers: chloroprene, 1,3-butadiene, isoprene, styrene, acrylonitrile, ethylene, propylene, vinyl acetate and (meth)acrylic acid esters with 1 to 18 C atoms in the alcohol component; i.e. polymers as described, e.g., in "Methoden der Organischen Chemie" (Houben-Weyl), vol. 14/1, Georg Thieme-Verlag, Stuttgart 1961, p. 393–406 and in C. B. Bucknall, "Toughened Plastics", Appl. Science Publishers, London 1977. Preferred polymers B are partially crosslinked and have gel contents of more than 20 wt. %, preferably more than 40 wt. %, particularly more than 60 wt. %.

Preferred graft polymers B comprise graft polymers of:

B.1) 5 to 95, preferably 30 to 80, parts by weight of a mixture of

B.1.1) 50 to 95 parts by weight of styrene, α-methyl styrene, styrene with methyl substitution in the ring, $C_1$–$C_8$-alkyl methacrylate, particularly methyl methacrylate, $C_1$–$C_8$-alkyl acrylate, particularly methyl acrylate, or mixtures of these compounds and B.1.2) 5 to 50 parts by weight of acrylonitrile, methacrylonitrile, $C_1$–$C_8$-alkyl methacrylates, particularly methyl methacrylate, $C_1$–$C_8$-alkyl acrylate, particularly methyl acrylate, maleic anhydride, $C_1$–$C_4$-alkyl- or -phenyl-N-substituted maleimides or mixtures of these compounds on B.2) 5 to 95, preferably 20 to 70 parts by weight of polymer with a glass transition temperature of less than –10° C.

Preferred graft polymers B are, e.g., polybutadienes, butadiene/styrene copolymers and polyacrylate rubbers grafted with styrene and/or acrylonitrile and/or alkyl (meth) acrylates; i.e. copolymers of the type described in DE-OS 1 694 173 (=U.S. Pat No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or alkyl styrenes, as described, e.g., in DE-OS 2 348 377 (=U.S. Pat. No. 3,919,353).

Particularly preferred graft polymers B are graft polymers obtainable by the grafting reaction of I. 10 to 70, preferably 15 to 50, particularly 20 to 40 wt. %, based on graft product, of at least one (meth)acrylic acid ester or 10 to 70, preferably 15 to 50, particularly 20 to 40 wt. % of a mixture of 10 to 50, preferably 20 to 35 wt. %, based on mixture, of acrylonitrile or (meth)acrylic acid ester and 50 to 90, preferably 65 to 80 wt. %, based on mixture, of styrene on II. 30 to 90, preferably 50 to 85, particularly 60 to 80 wt. %, based on graft product, of a butadiene polymer with at least 50 wt. %, based on II, of butadiene radicals as the graft base, the gel content of the graft base II preferably being at least 70 wt. % (measured in toluene), the degree of grafting G being 0.15 to 0.55 and the average particle diameter $d_{50}$ of the graft polymer B being 0.05 to 2, preferably 0.1 to 0.6 μm.

(Meth)acrylic acid esters I are esters of acrylic acid or methacrylic acid and monohydric alcohols with 1 to 18 C atoms. Methyl methacrylate, ethyl methacrylate and propyl methacrylate are particularly preferred.

The graft base II may contain, in addition to butadiene radicals, up to 50 wt. %, based on II, of radicals of other ethylenically unsaturated monomers, such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred graft base II consists of pure polybutadiene.

Since it is known that, during the grafting reaction, the graft monomers are not necessarily completely grafted on to the graft base, graft polymers B according to the invention also include those products that are obtained by polymerisation of the graft monomers in the presence of the graft base.

The degree of grafting G refers to the weight ratio of graft monomers grafted on to the graft base and is non-dimensional.

The average particle diameter $d_{50}$ is the diameter above and below which 50 wt. % of the particles lie. It may be determined by means of ultracentrifuge measurements (W. Scholtan, H. Lange, Kolloid, Z. und Z. Polymere 250 (1972), 782–796).

Particularly preferred graft polymers B are, e.g., also graft polymers of (a) 20 to 90 wt. %, based on B, of polyacrylate rubber with a glass transition temperature of less than –20° C. as the graft base and (b) 10 to 80 wt. %, based on B, of at least one polymerisable, ethylenically unsaturated monomer, the homopolymers or copolymers of which, formed in the absence of a), would have a glass transition temperature of more than 25° C., as graft monomers.

The polyacrylate rubbers (a) of the polymers B are preferably polymers of alkyl acrylates, optionally with up to 40 wt. %, based on (a), of other polymerisable, ethylenically unsaturated monomers. The preferred polymerisable acrylates include $C_1$–$C_8$-alkyl esters, for example methyl, ethyl, n-butyl, n-octyl and 2-ethylhexyl esters, and mixtures of these monomers.

Monomers with more than one polymerisable double bond may be copolymerised for crosslinking. Preferred examples of crosslinking monomers are esters of unsaturated monocarboxylic acids with 3 to 8 C atoms and unsaturated monohydric alcohols with 3 to 12 C atoms or saturated polyols with 2 to 4 —OH groups and 2 to 20 C atoms, such as e.g. ethylene glycol dimethacrylate, allyl methacrylate; polyunsaturated heterocyclic compounds, such as e.g. trivinyl and triallyl cyanurate; polyfunctional vinyl compounds, such as di- and trivinyl benzenes; but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, trivinyl cyanurate, triacryloyl hexahydro-s-triazine, triallyl benzenes.

The quantity of crosslinking monomers is preferably 0.02 to 5, particularly 0.05 to 2 wt. %, based on graft base (a).

In the case of cyclic crosslinking monomers with at least 3 ethylenically unsaturated groups, it is advantageous to limit the quantity to less than 1 wt. % of the graft base (a).

Preferred "other" polymerisable, ethylenically unsaturated monomers that may optionally be used besides the acrylic acid esters for the production of the graft base (a) are, e.g., acrylonitrile, styrene, α-methyl styrene, acrylamides, vinyl-$C_1$–$C_6$-alkyl ethers, methyl methacrylate, butadiene. Preferred polyacrylate rubbers as graft base (a) are emulsion polymers having a gel content of at least 60 wt. %.

Other suitable graft bases are silicone rubbers with graft-active points, as described in Offenlegungsschriften DE 37 04 657, DE 37 04 655, DE 36 31 540 and DE 36 31 539.

The gel content of the graft base (a) is determined at 25° C. in dimethyl formamide (M. Hoffmann, H. Kromer R. Kuhn, Polymeranalytik I and II, Georg Thieme-Verlag, Stuttgart 1977).

The aqueous dispersions of graft polymer B to be used for the preferred embodiment of the joint precipitation with the tetrafluoroethylene polymer D generally possess solids contents of 25 to 60, preferably of 30 to 45 wt. %.

Component C

The polymer mixtures according to the invention contain as flame retardant a mixture of a monophosphorus compound C.1 and a phosphorus compound C.2. Component C.1 represents a phosphorus compound according to formula (I).

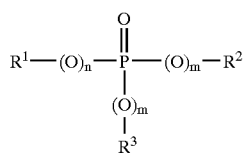

In the formula,

R$^1$, R$^2$ and R$^3$, independently of one another, signify C$_1$–C$_8$-alkyl, preferably C$_1$–C$_4$-alkyl, C$_6$–C$_{20}$-aryl, preferably phenyl or naphthyl or C$_7$–C$_{12}$-aralkyl, preferably phenyl-C$_1$–C$_4$-alkyl, m signifies 0 or 1 and n signifies 0 or 1.

The phosphorus compounds according to component C.1 that are suitable according to the invention are generally known (cf. for example Ullmanns Enzyklopädie der technischen Chemie, vol. 18, pp. 301 ff., 1979; Houben-Weyl, Methoden der Organischen Chemie, vol. 12/1, p. 43; Beilstein, vol. 6, p. 177). Preferred substituents R$^1$ to R$^3$ include methyl, butyl, octyl, phenyl, cresyl, cumyl and naphthyl. Methyl, ethyl, butyl, phenyl optionally substituted by methyl or ethyl, are particularly preferred.

Preferred phosphorus compounds C.1 (formula (I)) include, for example, tributyl phosphate, triphenyl phosphate, tricresyl phosphate, diphenylcresyl phosphate, diphenyloctyl phosphate, diphenyl-2-ethylcresyl phosphate, tri(isopropylphenyl) phosphate, dimethyl methylphosphonate, diphenyl methylphosphonate, diethyl phenylphosphonate, triphenylphosphine oxide and tricresylphosphine oxide.

Component C.2 represents a phosphorus compound of formula (II).

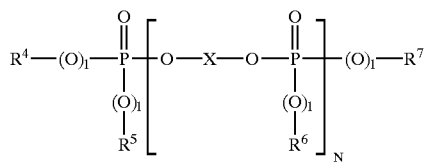

In the formula, R$^4$, R$^5$, R$^6$, R$^7$, independently of one another, signify C$_1$–C$_8$-alkyl, preferably C$_1$–C$_4$-alkyl, C$_5$–C$_6$-cycloalkyl, C$_6$–C$_{10}$-aryl or C$_7$–C$_{12}$-aralkyl, phenyl, naphthyl and benzyl being preferred. The aromatic groups R$^4$, R$^5$, R$^6$ and R$^7$ may themselves be substituted with alkyl groups. Particularly preferred aryl radicals are cresyl, phenyl, xylenyl, propylphenyl or butylphenyl.

X in formula (II) signifies a mononuclear or polynuclear aromatic radical with 6 to 30 C atoms. This is derived from diphenols such as, e.g., bisphenol A, resorcinol or hydroquinone or the diphenols described in the aforementioned formula (III).

I in formula (II) may be 0 or 1, independently of one another, I preferably being equal to 1.

N may assume values of between 1 and 5, preferably between 1 and 2. Mixtures of various phosphates may also be used as component C.2 according to the invention. In this case, N has an average value of between 1 and 5, preferably between 1 and 2.

The polymer mixtures according to the invention contain a mixture of C.1 and C.2 as flame retardant. The quantitative ratios of C.1 and C.2 here should be selected such that a synergistic action is achieved. The mixture generally consists of 10 to 90 wt. % of C.1 and 90 to 10 wt. % of C.2 (based on C in each case). Particularly favourable property conditions are obtained in the preferred range of 12 to 50, particularly 14 to 40, especially preferably 15 to 40 wt. % C.1 and 88 to 50, particularly 86 to 60, especially preferably 85 to 60 wt. % C.2.

Component D

The fluorinated polyolefins D are high molecular weight and possess glass transition temperatures of more than –30° C., usually more than 100° C., fluorine contents, preferably of 65 to 76, particularly of 70 to 76 wt. %, average particle diameters d$_{50}$ of 0.05 to 1000, preferably 0.08 to 20 μm. The fluorinated polyolefins D generally have a density of 1.2 to 2.3 g/cm$^3$. Preferred fluorinated polyolefins D are polytetrafluoroethylene, polyvinylidene fluoride, tetrafluoroethylene/hexafluoro-propylene and ethylene/tetrafluoroethylene copolymers. The fluorinated polyolefins are known (cf. "Vinyl and Related Polymers" by Schildknecht, John Wiley & Sons, Inc., New York, 1962, pages 484–494; "Fluorpolymers" by Wall, Wiley-Interscience, John Wiley & Sons, Inc., new York, vol. 13, 1970, pages 623–654; "Modem Plastics Encyclopedia", 1970–1971, vol. 47, part 10 A, October 1970, McGraw Hill, Inc., New York, pages 134 and 774; "Modem Plastics Encyclopedia", 1975–1976, October 1975, vol. 52, part 10 A, McGraw Hill, Inc., New York, pages 27, 28 and 472 and U.S. Pat. Nos. 3,671,487, 3,723,373 and 3,838,092).

They may be produced by known processes, such as, for example, by polymerising tetrafluoroethylene in an aqueous medium with a free radical-forming catalyst, for example sodium, potassium or ammonium peroxydisulfate under pressures of 7 to 71 kg/cm$^2$ and at temperatures of 0 to 200° C., preferably at temperatures of 20 to 100° C. (For further details, cf. e.g. U.S. Pat. No. 2,393,967). Depending on the form in which they are used, the density of these materials may be between 1.2 and 2.3 g/cm$^3$ and the average particle size between 0.05 and 1000 μm.

Fluorinated polyolefins D that are preferred according to the invention are tetrafluoroethylene polymers and have average particle diameters of 0.05 to 20 μm, preferably 0.08 to 10 μm, and a density of 1.2 to 1.9 g/cm$^3$ and are preferably used in the form of a coagulated mixture of emulsions of the tetrafluoroethylene polymers D with emulsions of the graft polymers B.

To produce a coagulated mixture of B and D, an aqueous emulsion (latex) of a graft polymer B with average latex particle diameters of 0.05 to 2 μm, particularly 0.1 to 0.6 μm, is first blended with a fine-particle emulsion of a tetrafluoroethylene polymer D in water with average particle diameters of 0.05 to 20 μm, particularly 0.08 to 10 μm; suitable tetrafluoroethylene polymer emulsions usually possess solids contents of 30 to 70 wt. %, particularly of 50 to 60 wt. %. The emulsions of the graft polymers B) possess solids contents of 25 to 50 wt. %, preferably of 30 to 45 wt. %.

The quantity stated in the description of component B includes the portion of the graft polymer for the coagulated mixture of graft polymer and fluorinated polyolefins.

The weight ratio of graft polymer B to the tetrafluoroethylene polymer D in the emulsion mixture is 95:5 to 60:40. The emulsion mixture is then coagulated by known means, for example by spray-drying, freeze-drying or coagulation by adding inorganic or organic salts, acids, bases or organic, water-miscible solvents, such as alcohols, ketones, preferably at temperatures of 20 to 150° C., particularly of 50 to 100° C. If necessary, drying may be carried out at 50 to 200° C., preferably 70 to 100° C.

Suitable tetrafluoroethylene polymer emulsions are commercial products and are offered, for example, by DuPont as Teflone®30 N.

Suitable fluorinated polyolefins D that may be used in powder form are tetrafluoroethylene polymers with average particle diameters of 100 to 1000 μm and densities of 2.0 g/cm³ to 2.3 g/cm³. Suitable tetrafluoroethylene polymer powders are commercial products and are offered, for example, by DuPont with the trade name Teflon®.

The moulding compositions according to the invention may contain conventional additives such as lubricants and mould release agents, nucleating agents, antistatic agents, stabilisers, fillers and reinforcing materials as well as dyes and pigments.

The filled and/or reinforced moulding compositions may contain up to 60, preferably 10 to 40 wt. %, based on the filled and/or reinforced moulding composition, of fillers and/or reinforcing materials. Preferred reinforcing materials are glass fibres. Preferred fillers, which may also have a reinforcing effect, are glass beads, mica, silicates, quartz, talcum, titanium dioxide and wollastonite.

The moulding compositions according to the invention, consisting of components A to D and optionally other known additives such as stabilisers, dyes, pigments, lubricants and mould release agents, fillers and reinforcing materials, nucleating agents and antistatic agents, are produced in that the relevant components are blended by known means and melt-compounded or melt-extruded at temperatures of 200° C. to 330° C. in conventional units such as internal mixers, extruders and double-shaft screws.

The present invention thus also relates to a process for the production of thermoplastic moulding compositions, consisting of components A to D and optionally stabilisers, dyes, pigments, lubricants and mould release agents, fillers and reinforcing materials, nucleating agents and antistatic agents, which is characterised in that components A to D and optionally stabilisers, dyes, pigments, flow promoters, fillers and reinforcing materials, lubricants and mould release agents, nucleating agents and/or antistatic agents, after blending is completed, are melt-compounded or melt-extruded at temperatures of 200° C. to 330° C. in conventional units, component D preferably being used in the form of a coagulated mixture with component B.

The blending of the individual components may take place by known means, both successively and simultaneously, and both at about 20° C. (room temperature) and at a higher temperature.

The moulding compositions of the present invention may be used to produce all types of mouldings. In particular, mouldings may be produced by injection moulding. Examples of mouldings that may be produced are: all types of housing parts, e.g. for domestic appliances such as juice presses, coffee machines, mixers, for office equipment such as VDUs or printers or covering plates for the construction sector and parts for the automotive sector. They are also used in the area of electrical engineering, as they have very good electrical properties.

The moulding compositions are particularly suitable for the production of thin-walled mouldings (e.g. data systems technology housing parts), where standards relating to the notched impact strength, weld line strength and flame resistance of the plastics used are particularly high.

Another form of processing is the production of mouldings by blow moulding or by thermoforming from previously produced sheets or films.

EXAMPLES

Component A.1

Polycarbonate based on bisphenol A with a relative solution viscosity of 1.26 to 1.28 measured in methylene chloride at 25° C. and a concentration of 0.5 g/100 ml.

Component A.2

Polycarbonate based on bisphenol A with a relative solution viscosity of 1.195 to 1.205 measured in methylene chloride at 25° C. and a concentration of 0.5 g/100 ml.

Component A.3

Polycarbonate based on bisphenol A with a relative solution viscosity of 1.305 to 1.315 measured in methylene chloride at 25° C. and a concentration of 0.5 g/100 ml.

Component A.4

Polycarbonate based on bisphenol A with a relative solution viscosity of 1.235 to 1.245 measured in methylene chloride at 25° C. and a concentration of 0.5 g/100 ml.

Component B

Graft polymer of 40 parts by weight of styrene and acrylonitrile in a 73:27 ratio on 60 parts by weight of crosslinked polybutadiene rubber in particle form (average particle diameter $d_{50}=0.3$ μm), produced by emulsion polymerisation.

Component C

C.1) Triphenyl phosphate (Disflamoll® TP from Bayer AG)

C.2) m-Phenylene-bis(diphenyl phosphate) (Fyrolflex RDP from Akzo)

Component D

Tetrafluoroethylene polymer (Teflon® from DuPont) as a coagulated mixture of a graft polymer emulsion B in water and a tetrafluoroethylene polymer emulsion in water. The weight ratio of graft polymer B) to the tetrafluoroethylene polymer D in the mixture is 90 wt. % to 10 wt. %. The tetrafluoroethylene polymer emulsion possesses a solids content of 60 wt. %, the average particle diameter is between 0.05 and 0.5 μm. The SAN graft polymer emulsion possesses a solids content of 34 wt. % and an average latex particle diameter of 0.3 μm.

Production of the Coagulated Mixture

The emulsion of the tetrafluoroethylene polymer (Teflon® 30 N from DuPont) is blended with the emulsion of the graft polymer B and stabilised with 1.8 wt. %, based on polymer solids, of phenolic antioxidants. At 85 to 95° C. the mixture is coagulated with an aqueous solution of $MgSO_4$ (Epsom salts) and acetic acid at pH 4 to 5, filtered and washed until practically free from electrolytes, subsequently freed from the majority of the water by centrifugation and then dried to a powder at 100° C. This powder may then be compounded with the other components in the units described.

Production and Testing of the Moulding Compositions According to the Invention

The components A to D are mixed in a 3-litre internal mixer. The material temperature is 220–240° C.

Bars of the moulding compositions, measuring 80×10×4 mm³ (processing temperature 260° C.), are produced on an injection moulding machine and both their notched impact resistance at room temperature (by ISO method 180 1A) and their Vicat B softening point according to DIN 53 460 are measured.

To determine the weld line strength, $a_nF$ the impact resistance is measured in accordance with DIN 53 453 at the weld line of specimens ejected at both sides (processing temperature 260° C.) with dimensions of 170×10×4 mm.

The fire behaviour of the samples was measured in accordance with UL-Subj. 94 V on bars with dimensions of 127×12.7×1.6 mm, produced on an injection moulding machine at 260° C.

The UL 94 V test is carried out as follows:

Samples of substance are moulded into bars with dimensions of 127×12.7×1.6 mm. The bars are mounted vertically in such a way that the bottom of the specimen is 305 mm above a strip of dressing material. Each test bar is individually ignited by means of two consecutive ignition operations of 10 s, the burning properties are observed after each ignition operation and the sample is then evaluated. A Bunsen burner with a 10 mm (3.8 inch) high blue flame of natural gas with a thermal unit of $3.73 \times 10^4$ kJ/m$^3$ (1000 BUT per cubic foot) is used to ignite the sample.

The UL 94 V-0 classification comprises the properties described below of materials tested in accordance with the UL 94 V specification. The moulding compositions in this class contain no samples that burn for longer than 10 s after each application of the test flame; they display no total flame time of more than 50 s when the flame was applied twice to each set of samples; they contain no samples that burn completely up to the fixing clamp attached to the upper end of the sample; they have no samples that ignite the cotton wool arranged below the sample as a result of burning drops or particles; nor do they contain any samples that glow for longer than 30 s after removing the test flame.

Other UL 94 classifications designate samples that are less flame resistant or less self-extinguishing as they give off flaming drops or particles. These classifications are designated UL 94 V-1 and V-2. F means "failed" and is the classification of samples having an afterburn time of ≧30 s.

A summary of the properties of the moulding compositions according to the invention is given in Tables 1 and 2 below:

The moulding compositions according to the invention display a very advantageous combination of properties of high heat resistance, good mechanical properties such as notched impact strength and weld line strength and excellent flame resistance (V-0 at 1.6 mm according to UL-94 V).

An addition of styrene copolymers leads to a small reduction in the heat resistance and notched impact strength and a drastic reduction in the weld line strength.

An increase in the quantity of flame retardant is reflected in a marked reduction in the heat resistance.

If a monophosphate is used alone, i.e. without oligophosphate, the flame proofing does not achieve the high level of the Examples according to the invention.

What is claimed is:

1. A flame resistant thermoplastic molding composition consisting of A) 70 to 98 parts by weight of an aromatic polycarbonate based on one or more of the diphenols of formula (III)

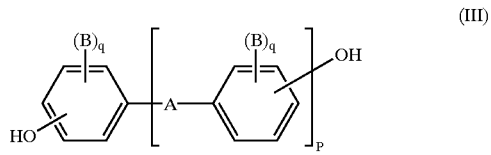

where

A signifies a single bond, $C_1$–$C_6$-alkylene, $C_2$–$C_6$-alkylidene, $C_5$–$C_6$-cyclo alkyliden, —S— or —SO$_2$—,
B independently of one another signify $C_6$–$C_{10}$-aryl and $C_7$–$C_{12}$ aralkyl, q signifies 0, 1 or 2 and

TABLE 1

Composition and properties of the moulding compositions

| Example | A1 | A2 | A3 | SAN | B | C.1 | C.2 | D | ak [KJ/m²] | aₙF [KJ/m²] | Vicat B120 [° C.] | UL 94 V at 1.6 mm |
|---|---|---|---|---|---|---|---|---|---|---|---|---|
| 1 | 55.0 | 38.0 | — | — | 4.5 | 0.50 | 1.50 | 0.5 | 56.7 | 80.9 | 135 | V-0 |
| 2 (comp.) | 55.0 | 35.0 | — | 3.0 | 4.5 | 0.50 | 1.50 | 0.5 | 54.4 | 17.5 | 135 | V-0 |
| 3 (comp.) | 55.0 | 33.0 | — | 5.0 | 4.5 | 0.50 | 1.50 | 0.5 | 50.5 | 11.4 | 133 | V-1 |
| 4 | 93.0 | — | — | — | 4.5 | 0.50 | 1.50 | 0.5 | 65.0 | 93.1 | 136 | V-0 |
| 5 | — | — | 93.0 | — | 4.5 | 0.50 | 1.50 | 0.5 | 66.0 | 87.8 | 136 | V-0 |
| 6 | 65.0 | 28.0 | — | — | 4.5 | 0.50 | 1.50 | 0.5 | 57.0 | 83.7 | 135 | V-0 |
| 7 | 45.0 | 48.0 | — | — | 4.5 | 0.50 | 1.50 | 0.5 | 52.0 | 78.3 | 133 | V-0 |
| 8 | 84.5 | 10.0 | — | — | 3.6 | 0.37 | 1.13 | 0.4 | 65.0 | 92.1 | 137 | V-0 |
| 9 | 74.5 | 20.0 | — | — | 3.6 | 0.37 | 1.13 | 0.4 | 63.0 | 92.6 | 137 | V-0 |
| 10 | 64.5 | 30.0 | — | — | 3.6 | 0.37 | 1.13 | 0.4 | 61.0 | 93.1 | 137 | V-0 |
| 11 | 54.5 | 40.0 | — | — | 3.6 | 0.37 | 1.13 | 0.4 | 58.0 | 85.3 | 136 | V-0 |

TABLE 2

Composition and properties of the moulding compositions

| Example | A1 | A2 | A4 | B | C.1 | C.2 | D | ak [KJ/m²] | Vicat B 120 [° C.] | UL 94 V at 1.6 mm |
|---|---|---|---|---|---|---|---|---|---|---|
| 12 | — | — | 93.0 | 4.7 | 0.50 | 1.50 | 0.3 | 57.0 | 133 | V-0 |
| 13 | — | — | 92.0 | 4.7 | 0.75 | 2.25 | 0.3 | 55.0 | 128 | V-0 |
| 14 | — | — | 91.0 | 4.7 | 1.00 | 3.00 | 0.3 | 49.0 | 124 | V-0 |
| 15 | — | — | 90.0 | 4.7 | 1.25 | 3.75 | 0.3 | 46.0 | 121 | V-0 |
| 16 (comp.) | — | — | 89.0 | 4.7 | 1.50 | 4.50 | 0.3 | 40.0 | 115 | V-0 |
| 17 (comp.) | — | — | 93.0 | 4.7 | 2.00 | — | 0.3 | 59.0 | 132 | f |
| 18 (comp.) | — | — | 92.0 | 4.7 | 3.00 | — | 0.3 | 58.0 | 128 | f |
| 19 (comp.) | — | — | 91.0 | 4.7 | 4.00 | — | 0.3 | 54.0 | 123 | V-2 |
| 20 (comp.) | — | — | 90.0 | 4.7 | 5.00 | — | 0.3 | 50.0 | 118 | V-2 |
| 21 (comp.) | — | — | 89.0 | 4.7 | 6.00 | — | 0.3 | 48.0 | 114 | V-1 |

P signifies 1 or 0, or of the dihydroxyphenylcycloalkanes of formula (IV),

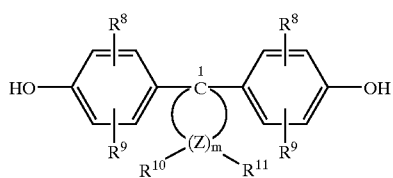

where
R$^8$ and R$^9$, independently of one another, signify hydrogen, C$_5$–C$_6$-cycloalkyl, C$_6$–C$_{10}$-aryl, and C$_7$–C$_{12}$-aralkyl, m signifies an integer from 4, 5, 6 or 7, R$^{10}$ and R$^{11}$, are selected individually for each Z and independently of one another, signify hydrogen or C$_1$–C$_6$-alkyl and Z signifies carbon, with the proviso that R$^{10}$ and R$^{11}$ both signify alkyl simultaneously on at least one Z atom, B) 0.5 to 20 parts by weight of a graft polymer having average particle diameter, d$_{50}$, of 0.05 to 2 μm, C) 0.5 to 5 parts by weight of a mixture of C.1) 10 to 90 wt. %, based on C, of a monophosphorus compound of formula (I)

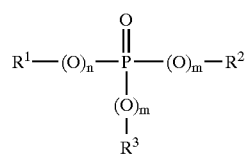

where
R$^1$, R$^2$ and R$^3$, independently of one another, signify C$_1$–C$_8$-alkyl, C$_8$–C$_{20}$-aryl or C$_7$–C$_{12}$-aralkyl, m signifies 0 or 1 and n signifies 0 or 1 and C.2) 90 to 10 wt. %, based on C, of a phosphorus compound of formula (II)

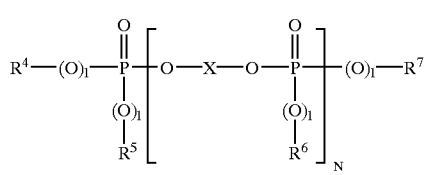

where
R$^4$, R$^5$, R$^6$, R$^7$, independently of one another, signify C$_1$–C$_8$-alkyl, C$_5$–C$_6$-cycloalkyl, C$_6$–C$_{10}$-aryl or C$_7$–C$_{12}$-aralkyl, l independently of one another, signifies 0 or 1, N signifies 1 to 5 and X signifies a mononuclear or polynuclear aromatic radical with 6 to 30 C atoms and D) 0.05 to 5 parts by weight of a fluorinated polyolefin with an average particle diameter of 0.05 to 1000 μm, a density of 1.2 to 2.3 g/cm3 and a fluorine content of 65 to 76 wt %, and at least one additive selected from the group consisting of stabilizers, dyes, pigments, lubricants, mold release agents, fillers, reinforcing agents, nucleating agents and static agents.

2. Moulding compositions according to claim 1, containing 75 to 98 parts by weight of an aromatic polycarbonate A.

3. Moulding compositions according to claim 1, containing graft polymers B) produced by copolymerisation of
   5 to 95 parts by weight of mixture of
      50 to 95 parts by weight of styrene, α-methyl styrene, styrene with alkyl substitution in the ring, C$_1$–C$_8$-alkyl methacrylate, C$_1$–C$_8$-alkyl acrylate or mixtures of these compounds and
      5 to 50 parts by weight of acrylonitrile, methacrylonitrile, C$_1$–C$_8$-alkyl methacrylate, C$_1$–C$_8$-alkyl acrylate, maleic anhydride, C$_1$–C$_4$-alkyl- or phenyl-N-substituted maleimide or mixtures of these compounds
   on 5 to 95 parts by weight of rubber with a glass transition temperature of less than −10° C.

4. Moulding compositions according to claim 3, containing as rubbers diene rubbers, polyacrylate rubbers, silicone rubbers or ethylene-propylene-diene rubbers.

5. Moulding compositions according to claim 1, containing component C in a quantity of a monophosphorus compound C.1 and an oligomeric phosphorus compound C.2 having a synergistic effect.

6. Moulding compositions according to claim 1, containing as component C a mixture of 12 to 50 wt. % C.1 and 50 to 88 wt. % C.2.

7. Moulding compositions according to claim 1, containing as component C.1 triphenyl phosphate.

8. Moulding compositions according to claim 1, containing as component C.2 an oligomeric phosphate in which R$_4$, R$_5$, R$_6$ and R$_7$ represent phenyl groups and X represents a phenylene group.

9. Moulding compositions according to claim 8, wherein X represents a bisphenylisopropylidene group.

10. Moulding compositions according to claim 1, wherein component D is used in the form of a coagulated mixture with component B.

11. A method of using the composition of claim 1, comprising making an injection molded article.

12. The molding composition of claim 1 wherein X is a radical derived from a diphenol conforming to formula (III).

13. The molding composition of claim 12 wherein X conforms to formula (III) and where q is 0.

14. The molding composition of claim 12 wherein X conforms to formula (IV) and wherein both R$^8$ and R$^9$ signify hydrogen.

15. The molding composition of claim 12 wherein X is at least one member selected from the group consisting of compounds conforming to of formula (III) where q is 0 and compounds conforming to formula (IV) where both R$^8$ and R$^9$ signify hydrogen.

16. The molding composition of claim 12 wherein X is at least one member selected from the group consisting of hydroquinone, resorcinol, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 1,1-bis(4-hydroxyphenyl)-3,3-dimethylcyclohexane, 1,1-bis(4-hydroxyphenyl)-3,3,5-trimethylcyclohexane and 1,1-bis(4-hydroxyphenyl)-2,4,4-trimethylcyclopentane.

* * * * *